US 6,604,361 B2

(12) United States Patent
Buckland et al.

(10) Patent No.: US 6,604,361 B2
(45) Date of Patent: Aug. 12, 2003

(54) METHOD AND SYSTEM FOR OPERATING AN ENGINE HAVING A TURBOCHARGER WITH AT LEAST TWO DISCRETE POSITIONS AND EXHAUST GAS RECIRCULATION (EGR)

(75) Inventors: Julia Helen Buckland, Dearborn, MI (US); Ilya V. Kolmanovsky, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/993,454

(22) Filed: Nov. 26, 2001

(65) Prior Publication Data
US 2003/0115873 A1 Jun. 26, 2003

(51) Int. Cl.$^7$ .............................................. F02B 33/44
(52) U.S. Cl. ...................................................... 60/605.2
(58) Field of Search ....................................... 60/605.2

(56) References Cited

U.S. PATENT DOCUMENTS

| 6,003,316 | A | | 12/1999 | Baert et al. | 60/605.2 |
|---|---|---|---|---|---|
| 6,055,810 | A | | 5/2000 | Borland et al. | 60/605.2 |
| 6,076,353 | A | | 6/2000 | Freudenberg et al. | 60/605.2 |
| 6,128,902 | A | | 10/2000 | Kolmanovsky et al. | 60/605.2 |
| 6,148,616 | A | | 11/2000 | Yoshida et al. | 60/605.2 |
| 6,155,049 | A | * | 12/2000 | Bischoff | 60/605.2 |
| 6,397,597 | B1 | * | 6/2002 | Gartner | 60/605.2 |
| 6,408,834 | B1 | * | 6/2002 | Brackney et al. | 60/605.2 |
| 6,457,461 | B1 | * | 10/2002 | Romzek | 60/605.2 |
| 6,460,522 | B1 | * | 10/2002 | Rimnac | 60/605.2 |
| 6,480,782 | B2 | * | 11/2002 | Brackney et al. | 60/605.2 |

FOREIGN PATENT DOCUMENTS

| GB | 2263939 A | 8/1993 | |
|---|---|---|---|
| WO | WO 00/42305 A | 7/2000 | 60/605.02 |
| WO | WO 01/14707 A | 3/2001 | 60/605.02 |
| WO | WO 01/66925 A | 9/2001 | 60/605.02 |

* cited by examiner

Primary Examiner—Thomas Denion
Assistant Examiner—Thai-Ba Trieu
(74) Attorney, Agent, or Firm—Allan J. Lippa (57) ABSTRACT

A method and system for controlling an engine having a turbocharger with at least two discrete positions and exhaust gas recirculation (EGR). The method includes producing a control signal to the turbocharger. The signal has two discrete levels. One of such levels is selected to provide a proper flow of air through the turbocharger to an intake of the engine and such selected level is modulated between such two levels over time to provide, over time, a proper pressure at an input of the EGR to enable a proper flow of exhaust gases from the exhaust of the engine through the EGR back to the intake of the engine. With such method, while there is relatively instantaneous control of the exhaust pressure at the input of the EGR, and hence proper instantaneous control of EGR flow through the EGR. Because of the relatively large inertia, and hence slower response time of the turbocharger to the control signal the turbocharger maintains proper boost flow to the input of the engine via the turbocharger with its accompanying improved fuel efficiency.

36 Claims, 4 Drawing Sheets

METHOD AND SYSTEM FOR OPERATING AN ENGINE HAVING A TURBOCHARGER WITH AT LEAST TWO DISCRETE POSITIONS AND EXHAUST GAS RECIRCULATION (EGR)

TECHNICAL FIELD

This invention relates to turbocharged internal combustion engines and more particularly to turbocharged internal combustion engines having exhaust gas recirculation (EGR) systems.

BACKGROUND

As is known in the art, high performance, high speed engines are often equipped with turbochargers to increase power density over a wider engine operating range, and EGR systems to reduce the production of NOx emissions.

More particularly, turbochargers use a portion of the exhaust gas energy to increase the mass of the air charge (i.e., boost) delivered to the engine combustion chambers. The larger mass of air can be burned with a larger quantity of fuel, thereby resulting in increased power, torque and fuel efficiency as compared to naturally aspirated engines.

As is also known in the art, EGR systems are used to reduce NOx emissions by increasing the dilution fraction in the intake manifold. EGR is typically accomplished with an EGR valve that connects the intake manifold and the exhaust manifold. In the cylinders, the recirculated burned exhaust gas acts as an inert gas, thus lowering the flame and in-cylinder gas temperature and, hence, decreasing the formation of NOx. On the other hand, the recirculated burned exhaust gas displaces fresh air and reduces the air-to-fuel ratio of the in-cylinder mixture.

A typical turbocharger includes a compressor and turbine coupled by a common shaft. The exhaust gas drives the turbine, which drives the compressor, which in turn, compresses ambient air and directs it into the intake manifold. Continuously variable geometry turbochargers (VGT) allow the intake airflow to be optimized continuously over a range of engine speeds. In diesel engines, this is accomplished by changing the angle of the inlet guide vanes on the turbine stator. An optimal position for the inlet guide vanes is determined from a combination of desired torque response, fuel economy, and emissions requirements.

As is known in the art, lean burn gasoline engines, for example direct injection (DI) stratified charge (DISC) gasoline engines, can potentially improve fuel economy and $CO_2$ emissions over conventional stoichiometric port fuel injected (PFI) engines. DISC engines operate with stratified combustion at very high air-fuel ratios, leading to reduced pumping losses and improved fuel economy. High air requirements limit the stratified operating regime to relatively low engine loads. One recent paper has been published ("Turbocharging the DI Gasoline Engine" by M. Wirth et al., Society of Automotive Engineers World Congress, SAE-2000-01-0251, March 2000) suggesting a potential for improvement in fuel economy by using boost to extend the lean operating regime of DISC gasoline engines. While implementation of a turbocharger with continuously variable turbine vanes in a boosted stratified system may provide the best compromise in terms of fuel economy and delivery of recirculated exhaust gas (EGR), such continuously VGT turbochargers are relatively expensive and relatively non-robust when used with high exhaust temperature gasoline engines.

SUMMARY

In accordance with the present invention, a method is provided for controlling an engine having a variable geometry turbocharger with at least two discrete positions and an exhaust gas recirculation (EGR). The method includes producing a control signal to the turbocharger. The signal has at least two discrete levels, corresponding in steady state to the two discrete positions of the turbocharger. One of such levels is selected to provide a proper flow of air through the turbocharger to an intake of the engine and such selected level is modulated between such two levels over time to provide, over time, a proper average pressure at an input of the EGR to enable a proper flow of exhaust gases from the exhaust of the engine through the EGR back to the intake of the engine.

With such method, while there is relatively instantaneous control of the exhaust pressure at the input of the EGR, and hence proper instantaneous control of EGR flow through the EGR, because of the relatively large inertia, and hence slower response time, of the turbocharger to the control signal the turbocharger maintains proper boost flow to the input of the engine with its accompanying improved fuel efficiency. Such method may be used for high temperature gasoline applications and diesel engine applications where less expensive VGTs may be desirable.

In one embodiment, a method is provided for controlling an engine having a turbocharger with at least two discrete positions and exhaust gas recirculation (EGR). The method includes producing a control signal for the turbocharger having two signal components, a first signal component having a level to drive the turbocharger to the either a desirable open or closed position selectively in accordance with engine operating conditions, and a second signal component comprising a train of pulses having a duty cycle selected to control time average pressure across the EGR.

In one embodiment, a method is provided for controlling an engine having a turbocharger with at least two discrete positions and exhaust gas recirculation (EGR). The method includes producing a control signal for the turbocharger having two signal components, a first signal component having a level to drive the turbocharger to the either a desirable open or closed position selectively in accordance with engine operating condition, and a second signal component modulating the first signal, such modulation being selected to control time average pressure across the EGR.

In one embodiment, a method is provided for controlling an engine having a turbocharger with at least two discrete positions and exhaust gas recirculation (EGR). The method includes producing a control signal for the turbocharger having two signal components, a first signal component having a level to drive the turbocharger to the either a desirable open or closed position selectively in accordance with engine operating conditions, and a second signal component modulating the first signal, such modulation being selected to control time average pressure across the EGR, such modulation having a bandwidth higher than the bandwidth of the turbocharger so that while the time average pressure at the EGR is changed substantially instantaneously, boost provided by the turbocharger is substantially invariant.

In accordance with one embodiment, a method is provided for controlling an engine having a turbocharger with at least two discrete positions and exhaust gas recirculation (EGR). The method includes producing a composite, bi-level control signal for the turbocharger. The composite signal includes a first signal component and a second signal component. The first signal component has either a first level or a second level. The first or second level is selected to provide either a relatively high or relatively low flow of air, respectively, through the turbocharger to an intake of the engine. The second signal component modulates the first signal component between the first and second levels to provide, over time, an average pressure at an input of the EGR to provide a proper flow of exhaust gases from the exhaust of the engine through the EGR back to the intake of the engine while the first signal component provides a proper flow of air through the turbocharger to the intake of the engine.

In accordance with one embodiment, a method is provided for controlling an engine having a turbocharger and exhaust gas recirculation (EGR). The turbocharger has a compressor portion and a turbine portion connected to the compressor portion. The inlet guide vanes of the turbine portion have at least two discrete positions. Exhaust from the engine is passed to an input of the EGR and an input to the turbine. Changes in a control signal to the turbine change pressure at the input of the EGR and changes flow through the compressor to the input of the engine. The method includes producing the control signal as a composite, bi-level control signal. The composite signal has a first signal component and a second signal component. The first signal component has either a first level or a second level. The first or second level is selected to provide either a relatively high or relatively low flow of air, respectively, through the turbocharger to an intake of the engine. The second signal component modulates the first signal component between the first and second levels to provide, over time, an average pressure at an input of the EGR to provide a proper flow of exhaust gases from the exhaust of the engine through the EGR back to the intake of the engine while the first signal component provides a proper flow of air through the turbocharger to the intake of the engine.

With such an arrangement, the variable geometry turbocharger (VGT) has only discrete positions, in one embodiment two discrete positions, and therefore such device is less costly and may be more robust to the high exhaust temperatures of gasoline engines. The discrete e.g., here two-position (i.e., a relatively open position and a relatively closed position) VGT operates with a continuously variable duty cycle that increases EGR delivery without sacrificing the fuel economy benefit of boosted operation.

More particularly, while the two-position VGT has only an open and a closed setting, it is able to effectively maintain proper EGR control by a variable duty cycle control signal. This type of device is useful for performance enhancement, particularly maximum power. Typically, the device is closed at low engine speeds to improve transient performance. At higher speeds, the device is opened to provide maximum flow through the turbine.

For areas of the DISC engine operating strategy where boost is used to extend the lean operating regime, the objective is not related to maximum power. Here boost is used to provide the airflow necessary to achieve lean air-fuel ratios (AFR) at higher speed and load conditions than is possible with a naturally aspirated engine, resulting in improved fuel economy.

In accordance with one feature of the invention, a variable duty cycle implementation is obtained with a two-discrete position VGT. With this implementation, the VGT is moved from open to closed position in a periodic fashion. Although EGR and fuel consumption may vary instantaneously, average EGR delivery can be modified while having little effect on average fuel consumption, because of the relatively non-responsiveness of the compressor and intake manifold to such periodic fashion.

The invention takes advantage of turbocharger lag to increase EGR delivery without sacrificing the benefit in fuel consumption achieved due to lean operation. More particularly, the response of the compressor portion of the turbocharger to the composite signal supplied to an inlet flow, for example inlet area control device for the turbine portion of the turbocharger is slower than the response to the exhaust pressure change at the input to the EGR. Thus, modulating the inlet flow control device for the turbine does not result in any significant change in the established condition of the compressor (i.e., boost to the intake of the engine) yet enables more rapid response in the pressure at the engine exhaust (i.e., at the input to of the EGR).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
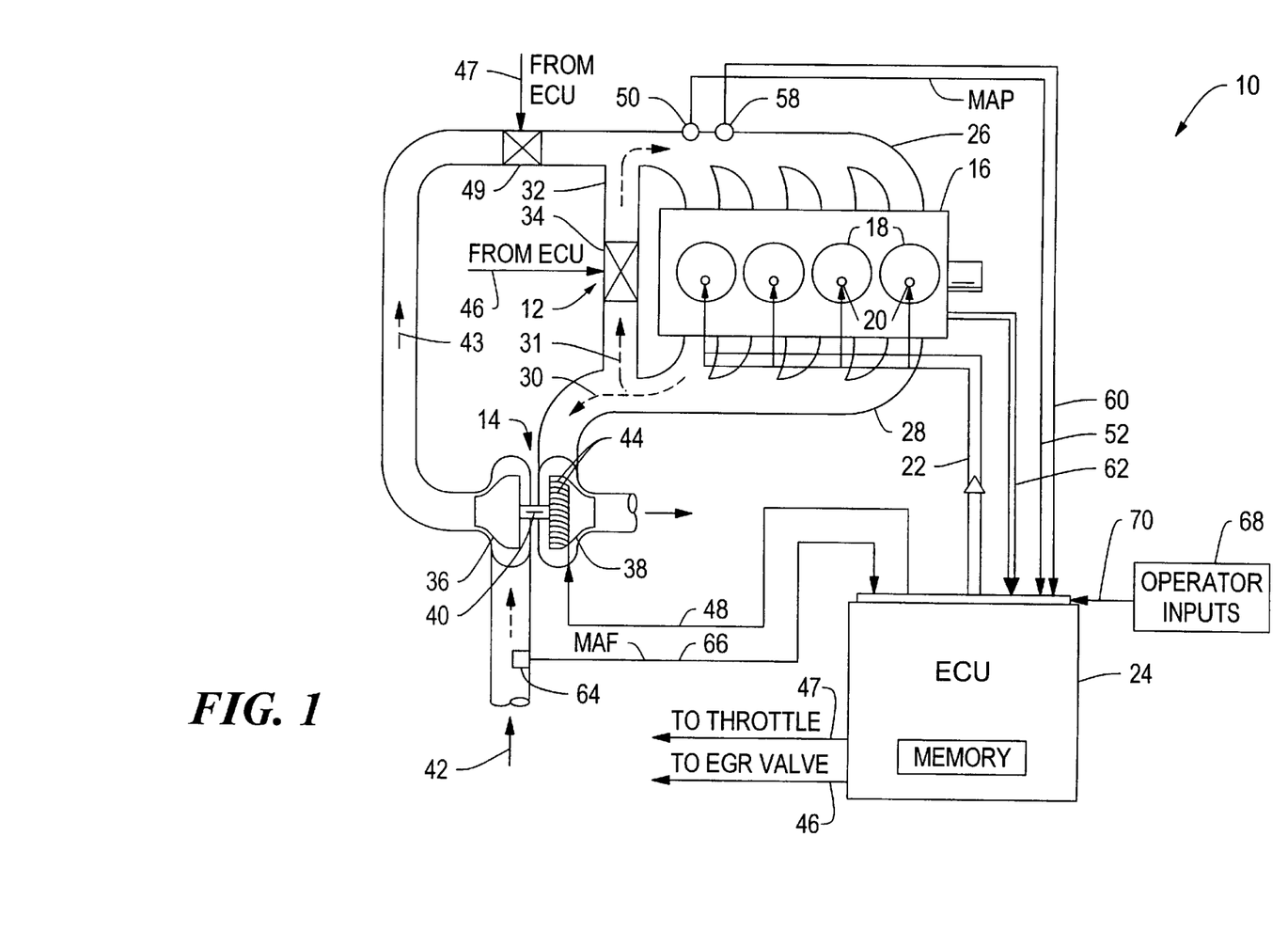
FIG. 1 is a schematic view of a gasoline engine system having an EGR system and a two-position VGT according to the invention.

Referring now to FIG. 1, a gasoline engine system 10 is shown. The engine includes an exhaust gas recirculation (EGR) system 12 and a two-position variable geometry turbocharger 14. That is, the turbocharger 14 has a compressor portion 36 and a turbine portion 38 with the turbine portion 38 having an inlet flow control device 44, with at least two, here two, discrete positions, i.e., open and closed. Here the inlet flow control device 44 is an inlet area control device for the turbine portion 38, here the set of turbine vanes. Other devices, such as shutters, flapper valves, sliders, for example, may be used. Further, the inlet area control device 44 may be within the turbine itself or may be upstream of the turbine. Thus, in either case, the turbine and the inlet area control device are referred to hereon as the turbine portion of the turbocharger.

A representative engine block 16 is shown having four combustion chambers 18. Each of the combustion chambers 18 includes here for example a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. Here for example, an external EGR having an EGR valve 34 regulates the amount of exhaust gas recirculated from the exhaust manifold 28. In the combustion chambers, the recirculated burned exhaust gas acts as an inert gas, thus lowering the flame and in-cylinder gas temperature and decreasing the formation of NOx. On the other hand, the recirculated burned exhaust gas displaces fresh air and reduces the air-to-fuel ratio of the in-cylinder mixture. It is noted that the flow of exhaust gas though the EGR valve 34 is a function of the pressure across such valve 34 in addition to the electrical signal provided to the valve on line 46 from the ECU 24. Here, there is no pressure sensor at the input to the EGR valve 34 (i.e., in the exhaust manifold 28). The electrical signal on line 46 is produced by the ECU 24 from relationships stored a priori in the ECU 24 in accordance with a computer program stored in the ECU 24.

The turbocharger 14 uses exhaust gas energy to increase the mass of the air charge (i.e., boost) delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

All of the engine systems, including the EGR 34, VGT 14 and fuel injectors 20 are controlled by the ECU. For example, signal 46 from the ECU 24 regulates the EGR valve position, and signal 48 regulates the position of the VGT guide inlet area control device, here vanes 44, and a signal on line 47 controls a throttle valve 49.

The turbocharger 14 includes a compressor 36 and a turbine 38 coupled by a common shaft 40. The exhaust gas 30 drives the turbine 38 which drives the compressor 36, which in turn, compresses ambient air 42 and directs it (arrow 43) into the intake manifold 26. The two-position turbocharger 14 can be modified as a function of engine operating condition, for example engine speed, during engine operation by varying the turbine flow area between either a relatively open position and a relatively closed position. This is accomplished by changing the angle of the inlet guide vanes 44 on the turbine 38. Here, the inlet guide vanes have either a relatively open position or a relatively closed position. Thus, here the inlet guide vanes have at least two discrete positions. The relatively open or closed position for the engine guide vanes 44 is determined from the desired engine operating characteristics at various engine speeds. It is noted that at a given operating condition, when in the relatively open position, the boost indicated by arrow 43 is relatively low whereas when in the relatively closed position the boost is relatively high. Further, when in the closed position, the pressure in the exhaust manifold, and hence at the input to the EGR valve is relatively high while in the open position the pressure is relatively low.

As noted above, the signal used to control the EGR valve 34 assumes a priori a time average pressure drop across the EGR valve. Consequently, changes in the position of the turbocharger vanes will change this time average pressure drop. Thus, it is desired to maintain the time average pressure drop across the EGR valve 34 while still providing the proper boost to the intake manifold from the turbocharger.

In the ECU 24, the command signals 46, 48 to the EGR 34 and VGT 14 actuators are calculated from measured or estimated variables and engine operating parameters by means of a control algorithm. Sensors and calibratable lookup tables residing in ECU memory provide the ECU 24 with engine operating information, except as noted above with regard to the time average pressure at the input to the EGR valve 34. For example, an intake manifold pressure (MAP) sensor 50 provides a signal 52 to the ECU indicative of the pressure in the intake manifold 26. Further, an air charge temperature sensor 58 provides a signal 60 to the ECU 24 indicative of the temperature of the intake air charge.

Additional sensory inputs are also received by the ECU along signal line 62 such as engine coolant temperature, engine speed, and throttle position. Additional operator inputs 68 are received along signal 70 such as the accelerator pedal position. For example, based on the sensory inputs and data stored in memory, for example engine mapping data, the ECU controls the EGR 34 to regulate the EGR flow fraction (r).

As noted above, the two-position VGT 14 has either an open or a closed setting, or position. It is unable to effectively maintain control at intermediate positions. Typically, the device is closed at low engine speeds to improve transient performance. At higher speeds, the device is opened. Thus, at low engine speed the control signal on line 48 is desirably at a level, which drives the vanes 44 in the VGT 14 to the open position while at higher speeds the control signal is desirably at a level, which drives the vanes 44 in the VGT 14 to the closed position. As will be described in more detail below, the control signal on line 48 has two signal components. One signal component has a level to drive the VGT vanes 44 to the desirable open or closed position based an engine operating condition as described above. The other, or second signal component, is a cyclic signal having a duty cycle selected to establish the proper time average pressure at the input to the EGR valve. More particularly, the first signal component is modulated by the second signal component. The rate of modulation is higher than the bandwidth of the VGT system 14 so that while the pressure at the EGR valve 34 is changed substantially instantaneously, the boost provided by the VGT 14 does not change substantially from the desired value. Thus, there is proper emission reduction by the EGR and high fuel economy provided by the VGT boost.

For areas of the DISC engine operating strategy where boost is used to extend the lean operating regime, the objective is not related to maximum power. Here boost is used to provide the airflow necessary to achieve lean air-fuel ratios (AFR) at higher speed and load conditions than is possible with a naturally aspirated engine, resulting in improved fuel economy.

For lean applications such as this, large amounts of EGR are required to meet stringent NOx emission standards. Thus, the appropriate level of EGR must be delivered without sacrificing the improvement in fuel economy gained by extending lean operation.

The AFR and EGR requirements are readily achieved with a continuously variable VGT but meeting these objectives is more difficult with a two-position device. This is illustrated with simulation results in Table 1 below. This table shows brake specific fuel consumption (BSFC) and maximum EGR rate at the open and closed settings for a boosted DISC engine operating at 2000 RPM with a load torque of 60 N-m. Here it is seen that fuel consumption and EGR are lowest at the open setting. To increase EGR to a higher level however, the VGT must be closed and fuel consumption is significantly higher. This behavior can be explained by considering the intake and exhaust manifold pressures at both VGT settings for the same operating condition, also shown in Table 1.

TABLE 1

| VGT Position | BSFC g/kW hr | EGR Rate % | Intake Pressure kPa | Exhaust Pressure kPa |
|---|---|---|---|---|
| Closed | 351.2 | 41.5 | 200.1 | 344.6 |
| Open | 271.3 | 16.0 | 103.6 | 115.3 |

At the open setting, the exhaust pressure is relatively low, resulting in a small pressure difference across the EGR valve thus limiting delivery of EGR. At the closed setting, exhaust pressure is high, allowing a significantly higher EGR rate. This high exhaust pressure also contributes to increased pumping losses however, leading to an increase in fuel consumption. In accordance with the invention, a method is provided to increase EGR delivery using a two-position VGT without a significant impact on fuel consumption.

More particularly, a variable duty cycle signal is fed by the ECU 24 to the VGT vanes 44 via line 48. As described above, the control signal on line 48 has two signal components. One signal component has a level to drive the VGT vanes 44 to the desirable open or closed position based an engine speed as described above. The other, or second signal component is a periodic signal having a duty cycle selected to establish the proper time average pressure at the input to the EGR valve. More particularly, the first signal component is modulated by the second signal component. The rate of modulation is higher than the bandwidth of the VGT 14 so that while the pressure at the EGR valve 34 is changed substantially instantaneously, the boost provided by the VGT 38 does not change substantially from the desired value. Thus, there is proper emission reduction by the EGR and high fuel economy provided by boost.

With this implementation, the VGT vanes 44 are moved from open to closed position in a cyclic fashion. Although EGR and fuel consumption may vary instantaneously, average EGR delivery can be increased without a significant effect on average fuel consumption.

Figure 2:
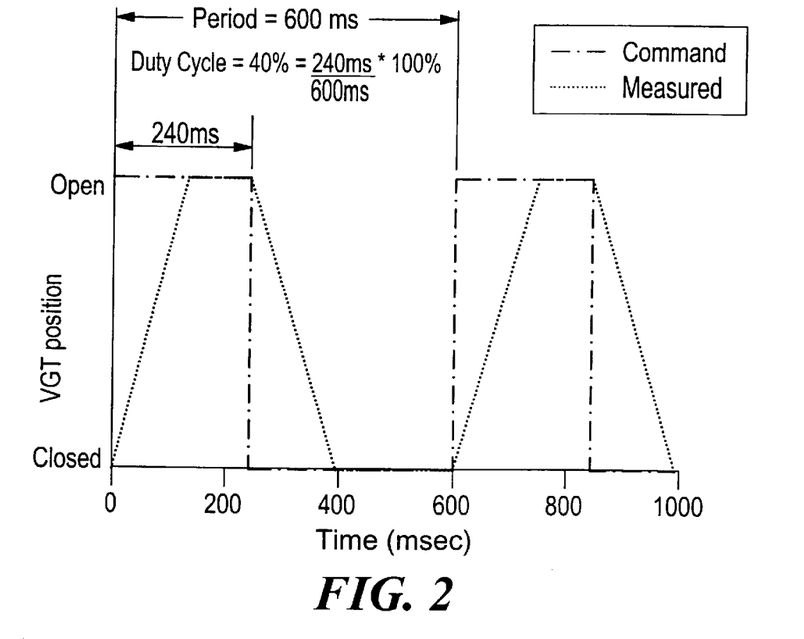
FIG. 2 is diagram showing VGT commanded position and VGT measured position as a function of time.

To aid explanation of the invention, we first present some definitions. The period is defined as the length of time required to complete one full cycle, where during one full cycle the VGT vanes 44 are moved from open to closed and returned to the open position. The duty cycle is the percentage of time the VGT vanes 44 are either open or closed during one period. For example, a 40% duty cycle indicates that the VGT vanes 44 are commanded open for 40% of the period and closed for 60% of the period. These concepts are illustrated in FIG. 2, which shows VGT vane 44 position versus time. Here it is assumed that 150 ms are required for the VGT vanes 44 to move from one position to the other. The EGR and fuel consumption objectives can be met with the proper choice of period and duty cycle.

Figure 3:
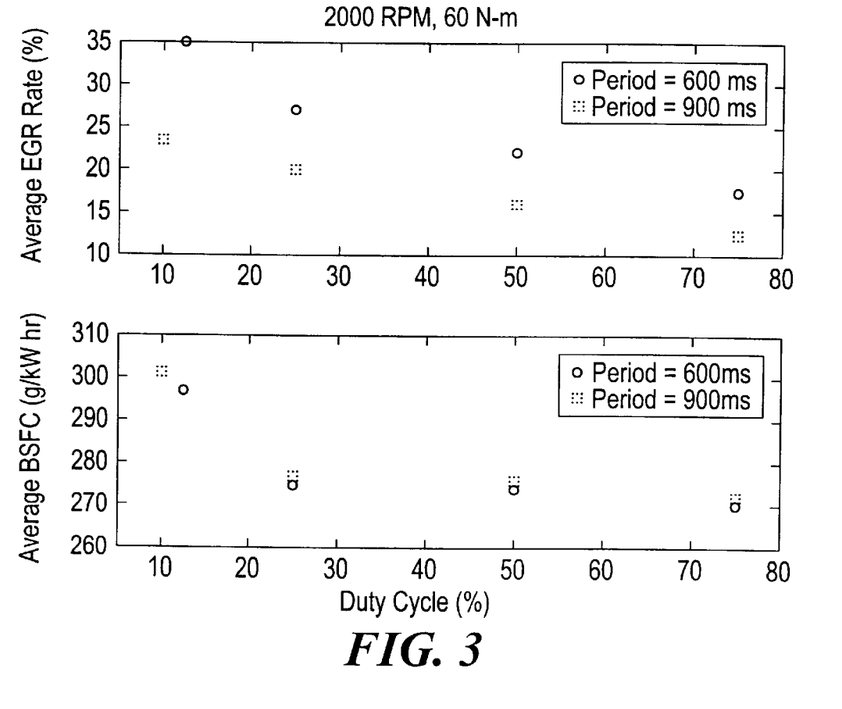
FIG. 3 are diagrams showing average EGR rate and average BSFC as a function of the duty cycle of a command signal fed to the VGT of FIG. 2, such VGT being used in the system of FIG. 1.
Figure 4:
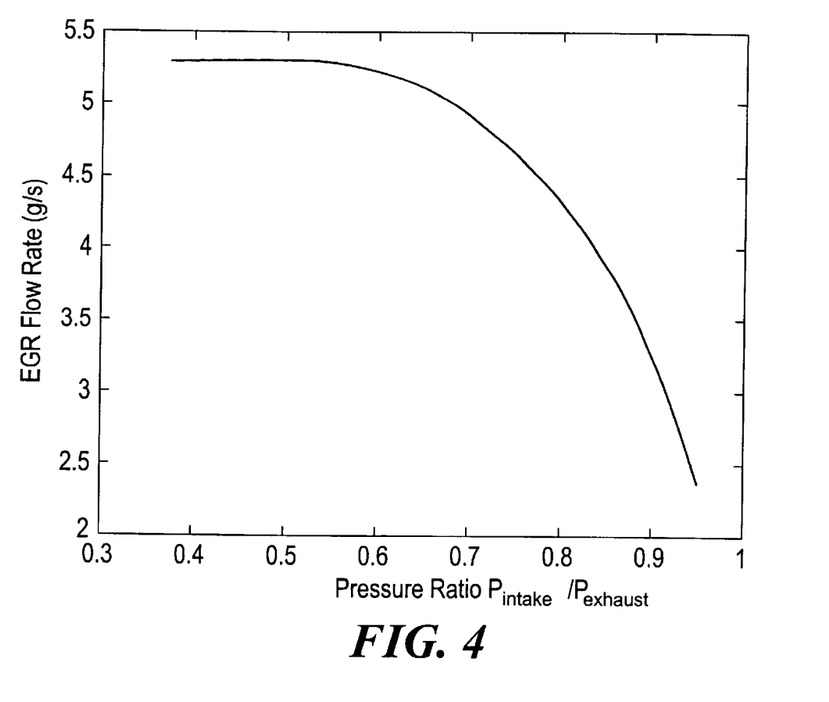
FIG. 4 is a diagram showing EGR flow rate as a function of the ratio of the pressure at the input of the EGR used in the EGR system of FIG. 1 (i.e., intake manifold pressure, $P_{intake}$) and the pressure at the output of the EGR (i.e., exhaust manifold pressure, $P_{exhaust}$)

The effects of period and duty cycle are demonstrated in FIG. 3, which shows average EGR and BSFC for several duty cycles for implementations with periods of 600 and 900 ms. EGR increases as does BSFC as duty cycle is decreased since the VGT spends more time closed. It is seen however, that at intermediate duty cycles, EGR increases substantially but BSFC increases very slightly. Thus this implementation can increase EGR with little impact on fuel economy.

The mechanism that produces this result is explained as follows. The exhaust manifold pressure responds faster than the intake manifold pressure to changes in VGT position, resulting in a significant change in the relationship between the two manifold pressures. Fuel consumption and EGR delivery are both affected by intake and exhaust pressure, but the effects are quite different. Fuel consumption is related to the pressure difference via pumping work, $$Tq_p = \alpha + \beta \Delta P$$

$$\Delta P = P_{exhaust} - P_{intake}.$$

In the case of EGR delivery, flow through the EGR valve is affected by the ratio of the intake and exhaust pressures. Consider the standard orifice flow equation given by $$W_{egr} = \frac{C_D \cdot A_{egr} \cdot P_{exhaust}}{\sqrt{R \cdot T_{exhaust}}} \cdot \xi$$

where:

$Tq_p$ is torque due to pumping losses $\alpha$ and $\beta$ are regression coefficients describing the relationship between $\Delta P$ and $Tq_p$.

$\gamma$ is ratio of specific heats $P_{intake}$ is intake manifold pressure $P_{exhaust}$ is exhaust manifold pressure $$\xi = \begin{cases} \left(\frac{P_{intake}}{P_{exhaust}}\right)^{1/\gamma} \cdot \sqrt{\frac{2}{(\gamma-1)} \cdot \left[1 - \left(\frac{P_{intake}}{P_{exhaust}}\right)^{(\gamma-1)/\gamma}\right]} ; & \left(\frac{P_{intake}}{P_{exhaust}}\right) > 0.5283 \\ \sqrt{\left(\frac{2}{(\gamma+1)}\right)^{(\gamma+1)/(\gamma-1)}} ; & \left(\frac{P_{intake}}{P_{exhaust}}\right) \leq 0.5283 \end{cases}$$

Figure 5:
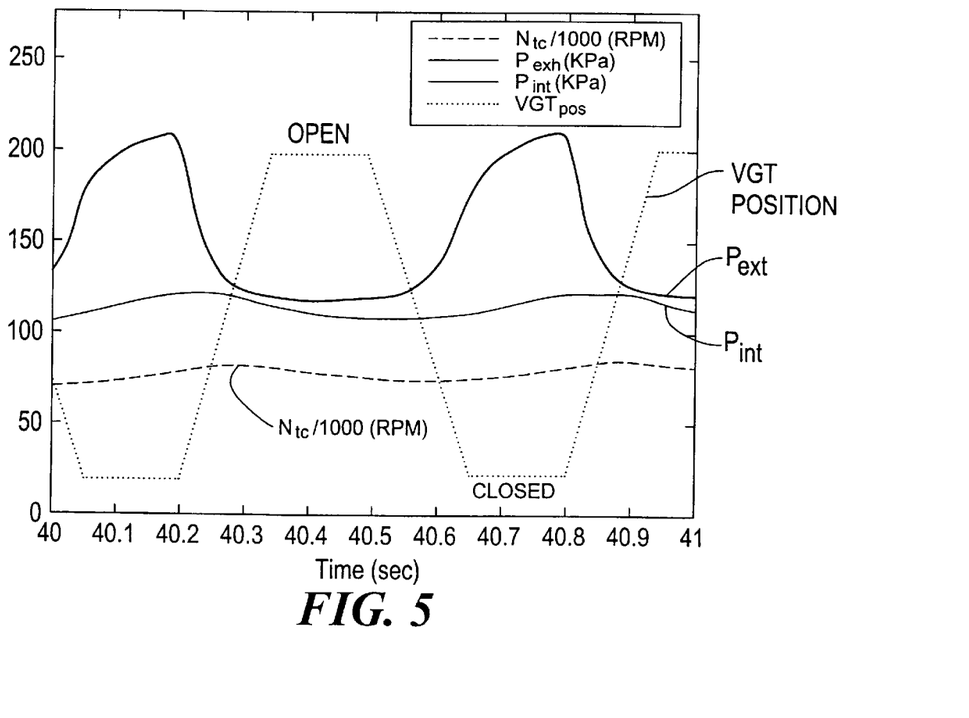
FIG. 5 is a diagram showing simulation results of VGT command signal with a 50% duty cycle, intake manifold pressure $P_{intake}$, exhaust manifold pressure $P_{exhaust}$ and Turbocharger speed $N_{tc}$, as a function of time.

For lean operating conditions, $$\left(\frac{P_{intake}}{P_{exhaust}}\right),$$

is relatively close to 1. As seen in FIG. 3, this is precisely where EGR flow is most sensitive to changes in pressure ratio. Thus, the decrease in pressure ratio produced by the VGT vanes 44 enhances EGR delivery dramatically. However, since the pumping work is affected in a linear way, the average fuel consumption is less affected, particularly by short durations of large pressure difference. Therefore, large amounts of EGR can be delivered very quickly, allowing us to open the VGT vanes 44 and reduce pumping loss before significantly impacting fuel consumption. This is illustrated in FIG. 5, which shows the responses of turbocharger speed, intake manifold pressure and exhaust manifold pressure to changing VGT vane 44 position. Note that the change in exhaust pressure is substantial and occurs quickly. The slower response of the turbocharger speed results in slower response of intake manifold pressure. This invention takes advantage of this turbocharger lag, which is typically considered a negative characteristic of boosted engines, to increase EGR delivery without sacrificing the benefit in fuel consumption achieved due to lean operation.

For implementation of this invention, driveability issues must be considered, specifically potential torque disturbances due to the change in pumping work with VGT vane 44 position. Control action, such as adjustments to fuel pulsewidth, spark timing, throttle position, etc. or supplemental torque sources, may be necessary to compensate for these disturbances, requiring adequate knowledge of the relationship between VGT vane 44 position and brake torque (pumping losses). For stoichiometric applications, coordinated control of throttle 49 will be necessary to maintain proper air-fuel ratio.

One system for generating the proper control signal for the inlet vanes on line 48 is with a look up table stored in a memory within the ECU 24 as shown in FIG. 1. For example, the memory would store the following relations, for duty cycle (DC) and period (P) as a function of engine speed and torque demand as a result of running a variety of tests on an engine type under a variety of conditions:

| DUTY CYCLE (%) ($DC_{Speed, Torque}$) → | | | | | | | | |
|---|---|---|---|---|---|---|---|---|
| Engine Speed | 500 | 1000 | 2000 | 3000 | 4000 | 5000 | 6000 | 8000 |
| Torque Demand ↓ | | | | | | | | |
| 0 | $DC_{500.0}$ | $DC_{1000.0}$ | $DC_{2000.0}$ | $DC_{3000.0}$ | $DC_{4000.0}$ | $DC_{5000.0}$ | $DC_{6000.0}$ | $DC_{8000.0}$ |
| 5 | $DC_{500.5}$ | $DC_{1000.5}$ | $DC_{2000.5}$ | $DC_{3000.5}$ | $DC_{4000.5}$ | $DC_{5000.5}$ | $DC_{6000.5}$ | $DC_{8000.5}$ |
| 10 | $DC_{500.10}$ | $DC_{1000.10}$ | $DC_{2000.10}$ | $DC_{3000.10}$ | $DC_{4000.10}$ | $DC_{5000.10}$ | $DC_{6000.10}$ | $DC_{8000.10}$ |
| 20 | $DC_{500.20}$ | $DC_{1000.20}$ | $DC_{2000.20}$ | $DC_{3000.20}$ | $DC_{4000.20}$ | $DC_{5000.20}$ | $DC_{6000.20}$ | $DC_{8000.20}$ |
| 50 | $DC_{500.50}$ | $DC_{1000.50}$ | $DC_{2000.50}$ | $DC_{3000.50}$ | $DC_{4000.50}$ | $DC_{5000.50}$ | $DC_{6000.50}$ | $DC_{8000.50}$ |
| 100 | $DC_{500.100}$ | $DC_{1000.100}$ | $DC_{2000.100}$ | $DC_{3000.100}$ | $DC_{4000.100}$ | $DC_{5000.100}$ | $DC_{6000.100}$ | $DC_{8000.100}$ |

| PERIOD(s) ($P_{Speed, Torque}$) → | | | | | | | | |
|---|---|---|---|---|---|---|---|---|
| Engine Speed | 500 | 1000 | 2000 | 3000 | 4000 | 5000 | 6000 | 8000 |
| Torque Demand ↓ | | | | | | | | |
| 0 | $P_{500.0}$ | $P_{1000.0}$ | $P_{2000.0}$ | $P_{3000.0}$ | $P_{4000.0}$ | $P_{5000.0}$ | $P_{6000.0}$ | $P_{8000.0}$ |
| 5 | $P_{500.5}$ | $P_{1000.5}$ | $P_{2000.5}$ | $P_{3000.5}$ | $P_{4000.5}$ | $P_{5000.5}$ | $P_{6000.5}$ | $P_{8000.5}$ |
| 10 | $P_{500.10}$ | $P_{1000.10}$ | $P_{2000.10}$ | $P_{3000.10}$ | $P_{4000.10}$ | $P_{5000.10}$ | $P_{6000.10}$ | $P_{8000.10}$ |
| 20 | $P_{500.20}$ | $P_{1000.20}$ | $P_{2000.20}$ | $P_{3000.20}$ | $P_{4000.20}$ | $P_{5000.20}$ | $P_{6000.20}$ | $P_{8000.20}$ |
| 50 | $P_{500.50}$ | $P_{1000.50}$ | $P_{2000.50}$ | $P_{3000.50}$ | $P_{4000.50}$ | $P_{5000.50}$ | $P_{6000.50}$ | $P_{8000.50}$ |
| 100 | $P_{500.100}$ | $P_{1000.100}$ | $P_{2000.100}$ | $P_{3000.100}$ | $P_{4000.100}$ | $P_{5000.100}$ | $P_{6000.100}$ | $P_{8000.100}$ |

Let X represent signal on line 48 (FIG. 1) for an "open" position of let vanes 44 and Y the signal on line 48 for a "closed" position:

WGT command signal 48
=X for DC*P/100 seconds
=Y for (1−DC/100)*P seconds

Thus for example, if the engine speed is 2000 and the torque demand is 500: the X (i.e., open vane position) command is for $[DC_{2000,500} * P_{2000,500}]/100$ seconds and, the Y (closed vand position) command is for $[1-(DC_{2000,500})/100]*P_{2000,500}$ seconds where $DC_{2000,100}$ and $P_{2000,100}$ are obtained from the memory in the ECU 24 (FIG. 1).

Only duty cycle DC and period P are required to formulate the signal on line 48 since, in this example, there are only 2 discrete values, X and Y.

Figure 6:
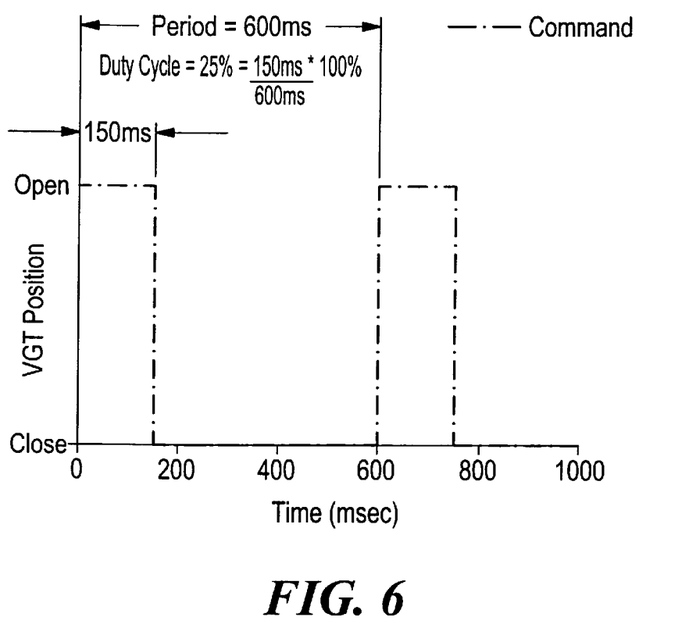
FIG. 6 is a time history diagram of an example of VGT command signal for a low speed condition.
Figure 7:
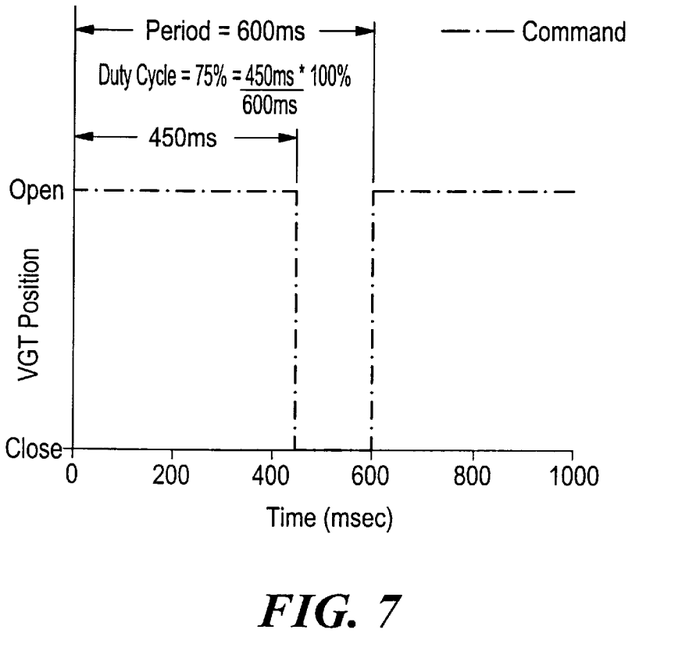
FIG. 7 is a time history diagram of an example of VGT command signal for a high speed condition.

FIG. 6 is a time history diagram of an example of VGT command signal 48 for a low speed condition and FIG. 7 is a time history diagram of an example of VGT command signal 48 for high speed condition. It should be understood that the actual duty cycle and period command will depend on speed of response of the VGT vanes 44, airflow requirements and the EGR necessary to meet emission requirements.

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling an engine having a turbocharger, such turbocharger having a compressor and a turbine, such turbine having inlet flow control device with at least two discrete positions, one of such positions being a relatively open position and another one of the positions being a relatively closed position, such engine having exhaust gas recirculation (EGR), comprising:

moving the inlet flow control device between the at least two discrete positions, one of such at least two discrete positions providing a desired flow of air through the turbocharger to an intake of the engine and for modulating such inlet flow control device position between such at least two positions over time to provide, over time, a desired pressure at an input of the EGR to enable a desired flow of exhaust gases from the exhaust of the engine through the EGR back to the intake of the engine.

2. The method recited in claim 1 wherein the inlet flow control device position has a duty cycle and period selected to provide the desired flow of exhaust gases from the exhaust of the engine through the EGR back to the intake of the engine.

3. The method recited in claim 1 wherein the inlet flow control device comprises an inlet area control device.

4. The method recited in claim 1 wherein other engine operating parameters are also controlled to compensate for potential torque disturbances introduced by the modulation.

5. The method recited in claim 1 wherein the modulation comprises modulating duty cycle and period of the inlet flow control device position.

6. The method recited in claim 1 wherein a throttle is included between the turbocharge and the intake to the engine, such throttle being operated in coordination with the control signal to maintain a desired air-fuel ratio for the engine.

7. A method for controlling an engine having a variable geometry turbocharger with at least two discrete positions and exhaust gas recirculation (EGR), such method comprising:

modulating a position of an inlet flow control device of the turbocharger between the at least two discrete positions to provide, over time, a desired average pressure at an input of the EGR to enable a desired flow of exhaust gases from the exhaust of the engine through the EGR back to the intake of the engine.

8. The method recited in claim 7 wherein one of the at least two discrete positions is an open position and another one of the at least two positions is a closed position and wherein the modulation is selected in accordance with engine operating condition to provide a desired amount of flow through the turbocharger and a desired pressure across the EGR.

9. The method recited in claim 7 wherein the inlet flow control device position has a duty cycle and period selected to provide the desired flow of exhaust gases from the exhaust of the engine through the EGR back to the intake of the engine.

10. The method recited in claim 7 wherein the inlet flow control device comprises an inlet area control device.

11. The method recited in claim 7 wherein other engine operating parameters are also controlled to compensate for potential torque disturbances introduced by the modulation.

12. The method recited in claim 7 wherein the modulation comprises modulating duty cycle and period of the inlet flow control device position.

13. The method recited in claim 7 wherein a throttle is included between the turbocharger and the intake to the engine, such throttle being operated in coordination with the control signal to maintain a desired air-fuel ratio for the engine.

14. A control system for controlling an engine having a turbocharger with at least two discrete positions and exhaust gas recirculation (EGR), such system comprising:

an engine control unit for moving an inlet control device of turbocharger between at least two discrete positions, one of such at least two discrete positions providing a desired flow of air through the turbocharger to an intake of the engine and for modulating such inlet flow control device between such at least two discrete positions over time to provide, over time, a desired pressure at an input of the EGR to enable a desired flow of exhaust gases from the exhaust of the engine through the EGR back to the intake of the engine.

15. The system recited in claim 14 wherein the moving inlet flow control device position has a duty cycle and period selected to provide the desired flow of exhaust gases from the exhaust of the engine through the EGR back to the intake of the engine.

16. The system recited in claim 14 wherein the engine includes an inlet flow control device for the turbocharger.

17. The system recited in claim 14 wherein other engine operating parameters are also controlled to compensate for potential torque disturbances introduced by the modulation.

18. The system recited in claim 14 wherein the modulation comprises modulating duty cycle and period of the inlet flow control device position.

19. The control system recited in claim 14 wherein a throttle is included between the turbocharger and the intake to the engine, such throttle being operated in coordination with the control signal to maintain a desired air-fuel ratio for the engine.

20. A control system for controlling an engine having a turbocharger having at least two discrete positions and exhaust gas recirculation (EGR), comprising:

an engine control unit for producing a control signal for the turbocharger having two signal components, a first signal component having a level to drive the turbocharger to the either a desirable open or closed position selectively in accordance with engine operating condition, and a second signal component modulating the first signal, with such modulation being selected to control pressure across the EGR, such modulation having a bandwidth higher than the bandwidth of the turbocharger so that while the pressure at the EGR is changed substantially instantaneously wherein boost provided by the turbocharger is substantially invariant.

21. The system recited in claim 20 wherein the control signal has a duty cycle and period selected to provide the desired flow of exhaust gases from the exhaust of the engine through the EGR back to the intake of the engine.

22. The system recited in claim 20 wherein the engine includes an inlet flow control device for the turbocharger.

23. The system recited in claim 20 wherein other engine operating parameters are also controlled to compensate for potential torque disturbances introduced by the modulation.

24. The system recited in claim 20 wherein the modulation comprises modulating duty cycle and period of the control signal.

25. The control system recited in claim 20 wherein a throttle is included between the turbocharger and the intake to the engine, such throttle being operated in coordination with the control signal to maintain a desired air-fuel ratio for the engine.

26. An engine control unit having a program stored therein for controlling an engine having a turbocharger, such turbocharger having a compressor and a turbine, such turbine having an inlet flow control device with at least two discrete positions, one of such positions being a relatively open position and another one of the positions being a relatively closed position, such engine having exhaust gas recirculation (EGR), such program causing the position of the inlet flow control device to move between the at least two discrete positions, one of such at least two discrete positions providing a desired flow of air through the turbocharger to an intake of the engine and for modulating such inlet flow control device between such at least two discrete positions over time to provide, over time, a desired pressure at an input of the EGR to enable a desired flow of exhaust gases from the exhaust of the engine through the EGR back to the intake of the engine.

27. The control unit recited in claim 26 wherein the moving inlet flow control device has a duty cycle and period selected to provide the desired flow of exhaust gases from the exhaust of the engine through the EGR back to the intake of the engine.

28. The control unit recited in claim 26 wherein the inlet flow control device comprises an inlet area control device.

29. The control unit recited in claim 26 wherein control of other engine operating parameters are also controlled to compensate for potential torque disturbances introduced by the modulation.

30. The control unit recited in claim 26 wherein the modulation comprises modulating duty cycle and period of the position.

31. The control unit recited in claim 26 wherein a throttle is included between the turbocharger and the intake to the engine, such throttle being operated in coordination with the control signal to maintain a desired air-fuel ratio for the engine.

32. An engine control unit having a program stored therein for controlling an engine having a turbocharger with at least two discrete positions and exhaust gas recirculation (EGR), such program causing an inlet flow control device of the turbocharger to move between at least two discrete positions to provide either a relatively high or relatively low flow of air, respectively, through the turbocharger to an intake of the engine and to modulate the inlet flow control device position between the at least two discrete to provide, over time, an average pressure at an input of the EGR to provide a desired flow of exhaust gases from the exhaust of the engine through the EGR back to the intake of the engine.

33. The control unit recited in claim 32 wherein the moving inlet flow control device position has a duty cycle and period selected to provide the desired flow of exhaust gases from the exhaust of the engine through the EGR back to the intake of the engine.

34. The control unit recited in claim 32 wherein other engine operating parameters are also controlled to compensate for potential torque disturbances introduced by the modulation.

35. The control unit recited in claim 32 wherein the modulation comprises modulating duty cycle and period of the moving.

36. The control unit recited in claim 32 wherein a throttle is included between the turbocharger and the intake to the engine, such throttle being operated in coordination with the control signal to maintain a desired air-fuel ratio for the engine.

* * * * *